United States Patent [19]

Granger

[11] 4,379,443
[45] Apr. 12, 1983

[54] INTAKE MANIFOLD MOUNTED AIR AND FUEL MIXTURE HEATER

[76] Inventor: Charles C. Granger, 1203 Chestnut St., Henderson, N.C. 27536

[21] Appl. No.: 183,039

[22] Filed: Sep. 2, 1980

[51] Int. Cl.³ .......................................... F02M 31/00
[52] U.S. Cl. .................................. 123/549; 123/546; 123/590; 261/142; 48/180 H
[58] Field of Search ............... 123/546, 590, 523, 549; 261/145, 144, 142; 48/180 R, 180 H

[56] References Cited

U.S. PATENT DOCUMENTS

| | | | |
|---|---|---|---|
| 2,019,050 | 10/1935 | Hoyt | 123/549 |
| 3,042,016 | 7/1962 | Christian | 123/546 |
| 4,031,875 | 6/1977 | Tyler | 123/523 |
| 4,068,638 | 1/1978 | Butler | 123/546 |
| 4,100,899 | 7/1978 | Chilton | 123/546 |
| 4,106,454 | 8/1978 | Henlis | 123/549 |
| 4,312,318 | 1/1982 | Davis | 123/590 |

Primary Examiner—Ronald H. Lazarus
Attorney, Agent, or Firm—Harvey B. Jacobson

[57] ABSTRACT

An air and fuel mixture heater for disposition between the usual opposing and coaction mounting flange portions of a combustion engine intake manifold and associated carburetor base mounting flange, and which heater basic structure and operation may also be incorporated in the inlet portion of the associated intake manifold, if desired, when carburetor air cleaner-to-hood clearance is minimal. The heater defines a thin hollow housing including a pair of closely spaced, parallel and registered opposite top and bottom side walls having at least generally registered air and fuel mixture openings formed therethrough. The housing also includes peripheral wall portions extending between corresponding peripheral edge portions of the housing side walls and baffle plate is mounted within the housing spaced intermediate and generally paralleling the housing side walls. The baffle plate includes at least one pair of opposite marginal portions spaced inwardly of the opposing peripheral wall portions of the housing and a heating coil is disposed within the housing between one side of the baffle plate and the opposing side wall of the housing in registry with the opening formed in the opposing housing side wall.

11 Claims, 7 Drawing Figures

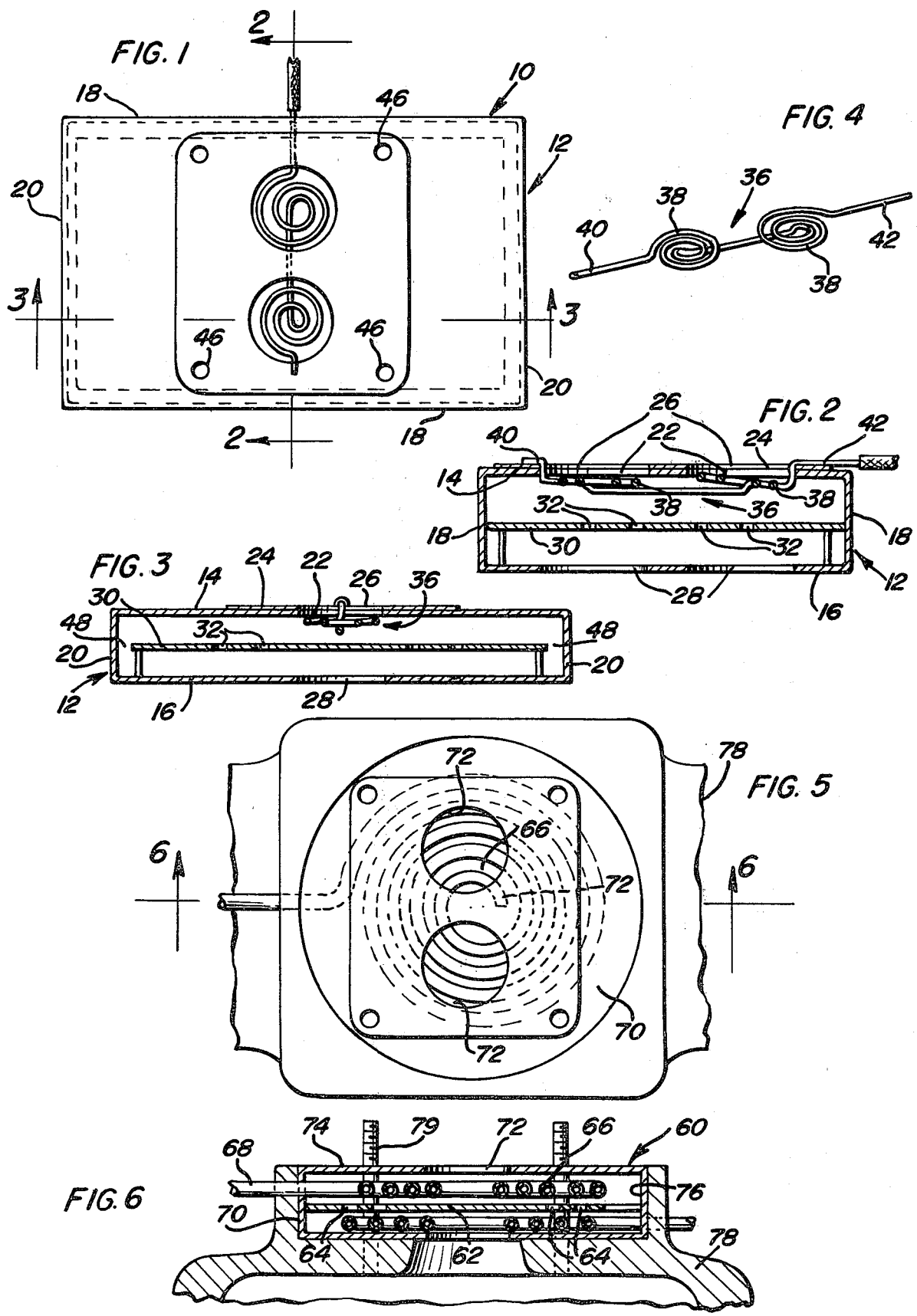

INTAKE MANIFOLD MOUNTED AIR AND FUEL MIXTURE HEATER

BACKGROUND OF THE INVENTION

Recent automotive engine technology in the areas of exhaust emission reduction and fuel economy has moved toward the recirculation of a portion of the exhaust gases of an internal combustion engine through the intake manifold thereof and higher heating of the air and fuel misture being supplied to the intake manifold. However, many vehicles equipped with internal combustion engines manufactured more than one or two years ago do not include provisions for recirculation of exhaust gases and higher heating of the air and fuel mixture supplied to the corresponding intake manifolds. Accordingly, a need exists for an air and fuel mixture heater which may be utilized to retrofit older vehicle engines in order to enable them to enjoy less exhaust emissions and greater fuel economy.

BRIEF DESCRIPTION OF THE INVENTION

The air and fuel mixture heater of the instant invention comprises a hollow housing including generally parallel opposite walls having inlet and outlet openings formed therein. The housing may be incorporated in the inlet portion of an intake manifold or interposed between a carburetor base and an associated combustion engine intake manifold. The housing includes internal heating coil structure therein for heating the air and fuel mixture passing therethrough from the associated carburetor into the associated intake manifold. In addition, the housing includes a central baffle plate for diverting the flow of air and fuel mixture therethrough in order to effect turbulence thereof and to promote more complete vaporization of the fuel in the air and fuel mixture. Also, one form of the disclosed air and fuel heater includes a tubular heating coil having a first open end thereof communicated with the exhaust system of the associated engine and a second open end thereof disposed within the housing for discharging a small portion of exhaust gases of the associated engine into the housing.

The main object of this invention is to provide an air and fuel mixture heater for disposition between the usual opposing and coacting mounting flange portions of a combustion engine intake manifold and carbureter base.

Another object of this invention is to provide an air and fuel mixture heater which will be capable of subjecting the air and fuel mixture flowing therethrough to turbulence in a manner to promote more complete vaporization of the fuel in the air and fuel mixture.

Yet another object of this invention is to provide an air and fuel mixture heater in accordance with the preceding objects and including an exhaust gas heating coil therein including a discharge end portion opening into the air and fuel mixture passage extending through the heater whereby exhaust gases of the associated internal combustion engine may be recirculated through the engine in order to promote increased fuel economy.

Another important object of this invention is to provide an air and fuel mixture heater constructed in a manner whereby slight variations thereof may be utilized on substantially all previously manufactured internal combustion engine powered vehicles.

A final object of this invention to be specifically enumerated herein is to provide an air and fuel mixture heater in accordance with the preceding objects and which will conform to conventional forms to manufacture, be of simple construction and easy to use so as to provide a device that will be economically feasible, long lasting relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a first form of an air and fuel mixture heater constructed in accordance with the present invention;

FIG. 2 is an enlarged vertical sectional view taken substantially upon the plane indicated by the section line 2—2 of FIG. 1;

FIG. 3 is a vertical sectional view taken substantially upon the plane indicated by the section line 2—2 of FIG. 1;

FIG. 4 is a perspective view of the electrical resistance heating element utilized in the air and fuel mixture heater of FIGS. 1, 2 and 3;

FIG. 5 is a top plan view of a second form of heater constructed in accordance with the present invention and recessed in the inlet portion of an intake manifold;

FIG. 6 is a vertical sectional view taken substantially upon the plane indicated by the section line 6—6 of FIG. 5.

DETAILED DESCRIPTION OF THE INVENTION

Figure 7:
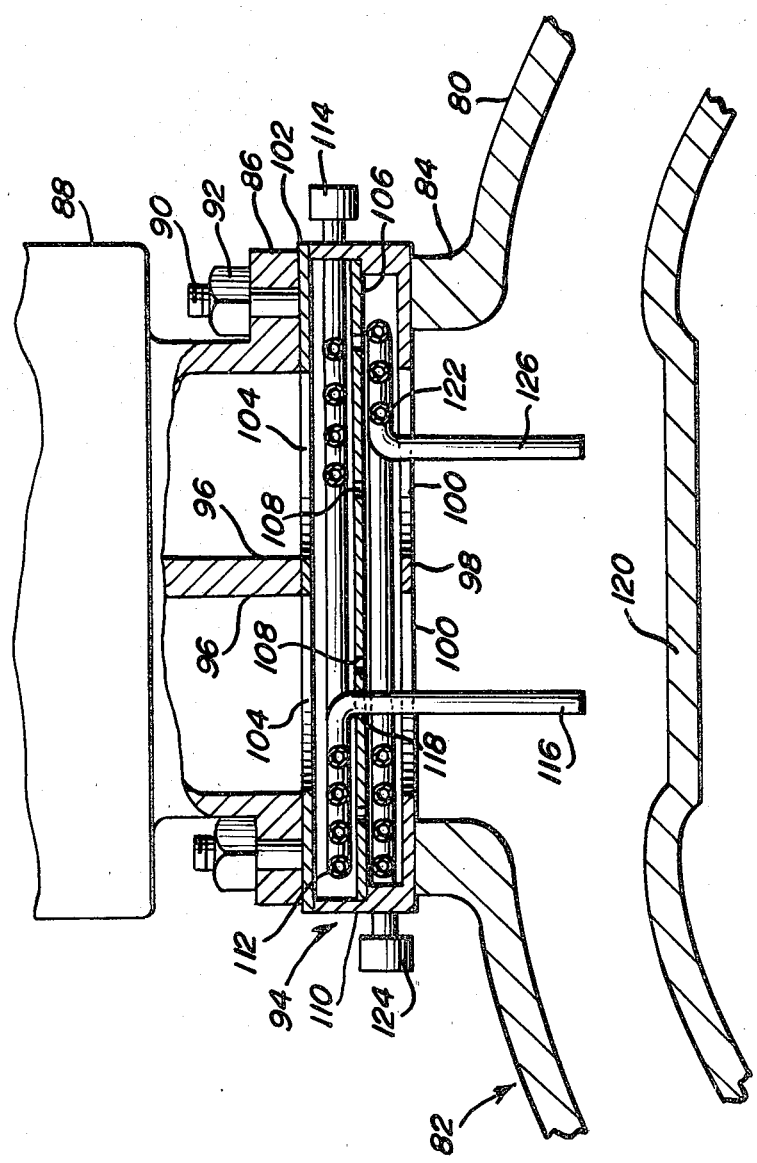
FIG. 7 is a transverse vertical sectional view of a third form of heater construction utilizing exhaust gas heating coils with each coil including an open outlet end portion (tail) projecting down into the associated manifold main chamber to improve the idling performance of the associated engine.

Referring now more specifically to the drawings, the numeral 10 generally designates a first form of air and fuel mixture heater constructed in accordance with the present invention. The heater 10 includes a hollow housing referred to in general by the reference numeral 12 including top and bottom side walls 14 and 16 interconnected by pairs of opposite peripheral wall portions 18 and 20 extending and secured between corresponding peripheral edge portions of the top and bottom side walls 14 and 16. The top side wall has a pair of inlet openings 22 formed therein and a gasket 24 disposed thereover having openings 26 formed therein registered with the inlet openings 22. The bottom side wall 16 has a pair of openings 28 formed therein corresponding to the openings 22 and the housing 12 includes a central baffle plate 30 supported therein generally centrally intermediate and paralleling the top and bottom side walls 14 and 16. The baffle plate or partition 30 includes a plurality of horizontally spaced apart apertures 32 formed therethrough and a heating coil assembly referred to in general by the reference numeral 36 is disposed within the housing 12 below the top side wall 14 and includes a pair of coil portions 38 registered with the openings 22. The heating coil assembly 36 includes one end portion 40 which may be suitably grounded in any convenient manner (not shown) and a second end portion 42 which may be electrically connected to any suitable source of electrical potential (not shown) of the associated vehicle, such as the battery of the vehicle.

The housing 12 includes four mounting bores 46 formed through the top and bottom side walls 14 and 16 as well as the baffle plate 30 and suitable cap screws (not shown) or the like may be utilized to secure the housing 12 between the base mounting flange of a carburetor and the opposing mounting flange of an associated intake manifold.

Remote side edge portions of the baffle plate 30 abut against the peripheral wall portions 18, but the marginal edge portions of the baffle plate 30 opposing the peripheral wall portions 20 are spaced inwardly thereof as at 48, see FIG. 3.

Accordingly, an air and fuel mixture passing through the housing 12 enters the latter through the openings 22 and is warmed by the heating coil assembly 36. Thereafter, a major portion of the air and fuel mixture passes about the opposite ends of the baffle plate 30 through the areas 48 and into the area of the interior of the housing 12 below the baffle plate 30. Thereafter, the heated air and fuel mixture passes outwardly of the housing through the openings 28 and into the associated intake manifold (not show). However, some of the air and fuel mixture passing through the housing 12 passes directly through the baffle plate 30 via the apertures or openings 32 therein. By passing the air and fuel mixture through the spaces 48 and the openings or apertures 32, considerable additional turbulence is imparted to the air and fuel mixture during the heating process to thereby enhance total vaporization of the fuel within the air and fuel mixture.

With attention now invited more specifically to FIGS. 5 and 6 of the drawings, there may be seen a modified form of air and fuel mixture heater referred to in general by the reference numeral 60. The heater 60 is circular, but is similar to the heater 10, except that the baffle plate 62 of the heater 60 includes arcuate slots 64 as opposed to the horizontally spaced apart apertures or bores 32 formed through the baffle plate 30. In addition, in lieu of the heating coil assembly 36, the heater 60 includes a single coil 66 comprising a tubular member including a first end 68 opening outwardly of the circular housing 70 of the heater 60 for open connection with the exhaust system of the associated internal combustion engine and a second open end 71 which opens into the interior of the housing 70 for recirculating a small portion of the exhaust gases of the associated internal combustion engine through the induction system thereof. However, the single heating coil 66 is in registry with the openings 72 formed in the top side wall 74 of the housing 70 and the convolutions of the coil 60 are slightly spaced apart. In this manner, maximum heating of the air and fuel mixture passing through the housing 70 is effected. Of course, any suitable control (not shown) may be provided and utilized to variably control the flow of engine exhaust gases to the heating coil 66. Also, the heater 66 is flush mounted within a recess 76 milled in the inlet portion of an intake manifold 78. The carburetor mounting studs 79 of the manifold pass upwardly through the heater 60. Further, the equivalent of the top, and bottom walls and the baffle plate of the heater 60 may be originally cast in the intake manifold 78.

Referring now more specifically to FIG. 7 of the drawings, there may be seen an intake manifold 80 of a combustion engine referred to in general by the reference numeral 82. The combustion engine 82 may be of the in-line type or a V-type engine of either 8, 6 or 4 cylinders. The intake manifold 80 is of the type generally utilized in conjunction with a V-type engine.

The manifold 80 includes a carburetor mounting boss 84 upon which the base flange 86 of a conventional carburetor 88 is usually mounted by mounting studs 90 and attaching nuts 92. The carburetor 88 may comprise a single barrel carburetor, a 2-barrel carburetor or a 4-barrel carburetor including primary and secondary barrels.

A hollow housing referred to in general by the reference numeral 94 is interposed between the mounting boss 84 of the manifold 80 and the mounting flange 86 of the carburetor 88. The carburetor 88 includes at least two barrels 96 extending therethrough and the housing 94 includes a bottom wall 98 including a pair of openings 100 formed therethrough in alignment with the barrels 96. The housing 94 includes a removal top wall 102 including openings 104 formed therethrough corresponding to the openings 100 and which are also registered with the barrels or passages 96.

The interior of the housing 94 includes a partial transverse baffle or partition 106 disposed therein and the partition 106 includes a plurality of openings 108 formed therethrough and which may be omitted in certain instances. In addition, the partition 106 may include marginal edge portions (not shown) spaced from the opposing upstanding side walls 110 of the housing 94. If the openings 108 are omitted, at least one marginal portion of the partition 106 must be spaced from the opposing side wall 110 of the housing 94. On the othe hand, if the partition 106 does not include a marginal edge which is spaced from the corresponding side wall 110 of the housing 94, the openings 108 must be provided. In addition, the openings 108 may be provided even if one of the marginal edge portions of the partition 106 is spaced from the corresponding side wall 110 of the housing 94.

The interior of the housing constitutes a transverse enlargement of the overall fuel and air induction passages for the associated internal combustion engine 82 comprising the barrels 96 and the inlet portion of the manifold 80 defined by the mounting boss 84.

The upper interior portion of the housing 94 above the partition 106 defines an inlet portion thereof and the lower portion of the interior of the housing 94 below the partition 106 defines an outlet portion thereof. The upper inlet portion includes a first tubular heating coil 112 disposed therein including an inlet end 114 for communication with a source (not shown) of engine exhaust gases and an outlet end portion 116 which opens downwardly through an opening 118 provided therefor in the partition 106 and also downwardly through one of the openings 100. The outlet end portion 116 projects downwardly into the interior of the manifold 80, but terminates a spaced distance from the floor 120 thereof.

A second coil 122 is disposed within the housing 94 below the partition 106 and includes an inlet end 124 corresponding to the inlet end 114. Also, the coil 122 includes an outlet end 126 corresponding to the outlet end 116 and which also opens downwardly into the interior of the manifold 80 above the floor 120 thereof.

When the apparatus is to be used in conjunction with some internal combustion engines, it may not be necessary to provide the coils 112 and 122 with end portions which project downwardly through the partition 106 and the bottom wall 98 of the housing and into the interior of the manifold 80. However, with some internal combustion engines it has been found that the idling characteristics of these engines may be greately improved by including the end portions 116 and 126 which project downwardly into the manifold 80.

If the manifold 80 and the carburetor 88 are of the 4-barrel type, the secondary barrels may have the throttle plate (not shown) thereof fixed in a closed position and the top and bottom walls 102 and 98 of the housing may be imperforate in the areas thereof registered with the secondary barrels, except that the bottom wall 98 will have small openings formed therethrough to allow engine vacuum to be effective in the secondary barrels inasmuch as vacuum assisted power brakes are usually connected to the secondary barrels of an associated 4-barrel carburetor.

It is also pointed out that the housing 94 may be cast as an integral portion of the intake manifold 80. Of course, the coil 112 or coils 112 and 122 will be formed separately from the manifold 80 in such case. Further, it is pointed out that the coils heat the air and fuel mixture by conduction and radiation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a combustion engine of the type including air and fuel mixture induction passage means, an air and fuel mixture heater for said combustion engine, said heater including structure defining a transversely enlarged thin hollow chamber in said passage means including a first pair of closely spaced, parallel and registered opposite side walls having at least generally registered inlet and outlet air and fuel mixture openings formed therethrough opening upstream and downstream into said passage means, said chamber also including peripheral wall portions extending between corresponding peripheral edge portions of said side walls, a baffle plate mounted in said chamber spaced intermediate and generally paralleling said side walls and registered with and extending outwardly beyond all marginal portions of said openings, said baffle plate including at least one pair of opposite marginal portions thereof spaced inwardly of the opposing peripheral wall portions of said chamber each marginal portion defining with the opposing peripheral wall a passage therebetween, said baffle plate further including a plurality of additional openings formed. Therethrough spaced inwardly from said marginal portions, and a generally flat heating coil assembly disposed in said chamber between one side of said baffle plate and the opposing side wall of said chamber in registry with the opening in said opposing housing side wall, said heating coil assembly including a main coil portion consisting of a plurality of continuous spiral convolutions, said main coil portion being of a plan area at least substantially equal to the cross sectional areas of the opening with which said main coil portion is registered.

2. The combination of claim 1 wherein said side walls each include a plurality of air and fuel mixture openings formed therethrough, said heating main coil assembly including a plurality of main coil portions thereof with one coil portion registered with each of said air and fuel mixture openings formed in said opposing chamber side wall.

3. The combination of claim 1 wherein said chamber side walls each has a plurality of air and fuel mixture openings formed therethrough, said heating main coil assembly including a single coil portion registered with the plurality of openings formed in said opposing housing side wall.

4. The combination of claim 1 wherein said heating coil assembly comprises an electrical resistance heating coil assembly.

5. The combination of claim 1 wherein said heating coil assembly comprises a tubular coil member having a first inlet end portion adapted to be communicated with a source of engine exhaust gases and an outlet end portion opening into said chamber for recirculating a portion of the exhaust gases from the associated combustion engine through the induction system of the engine.

6. The combination of claim 5 wherein said chamber side walls each has a plurality of air and fuel mixture openings formed therethrough, said heating coil assembly including a single coil portion registered with the plurality of openings formed in said opposing chamber side wall.

7. The combination of claim 1 wherein said additional openings comprise small diameter bores.

8. The combination of claim 1 wherein said additional openings comprise a plurality of arcuate slots arranged and concentric with a central axis.

9. The combination of claim 1 wherein said structure comprises a hollow housing composed of said opposite side walls and peripheral walls, said housing being adapted to be interposed between the usual opposing coacting mounting flange portions of a combination engine intake manifold and carburetor base.

10. The combination of claim 1 wherein said structure comprises a hollow housing composed of said opposite side walls and peripheral walls, said housing being recessed within the inlet portion of an engine intake manifold.

11. The combination of claim 1 wherein said heating coil assembly comprises a tubular coil member having a first inlet end portion adapted to be communicated with a source of engine exhaust gases and an outlet end portion, said outlet end projecting through said outlet opening in a downstream direction into the portion of said passage downstream from said chamber.

* * * * *